(United States Patent Office)

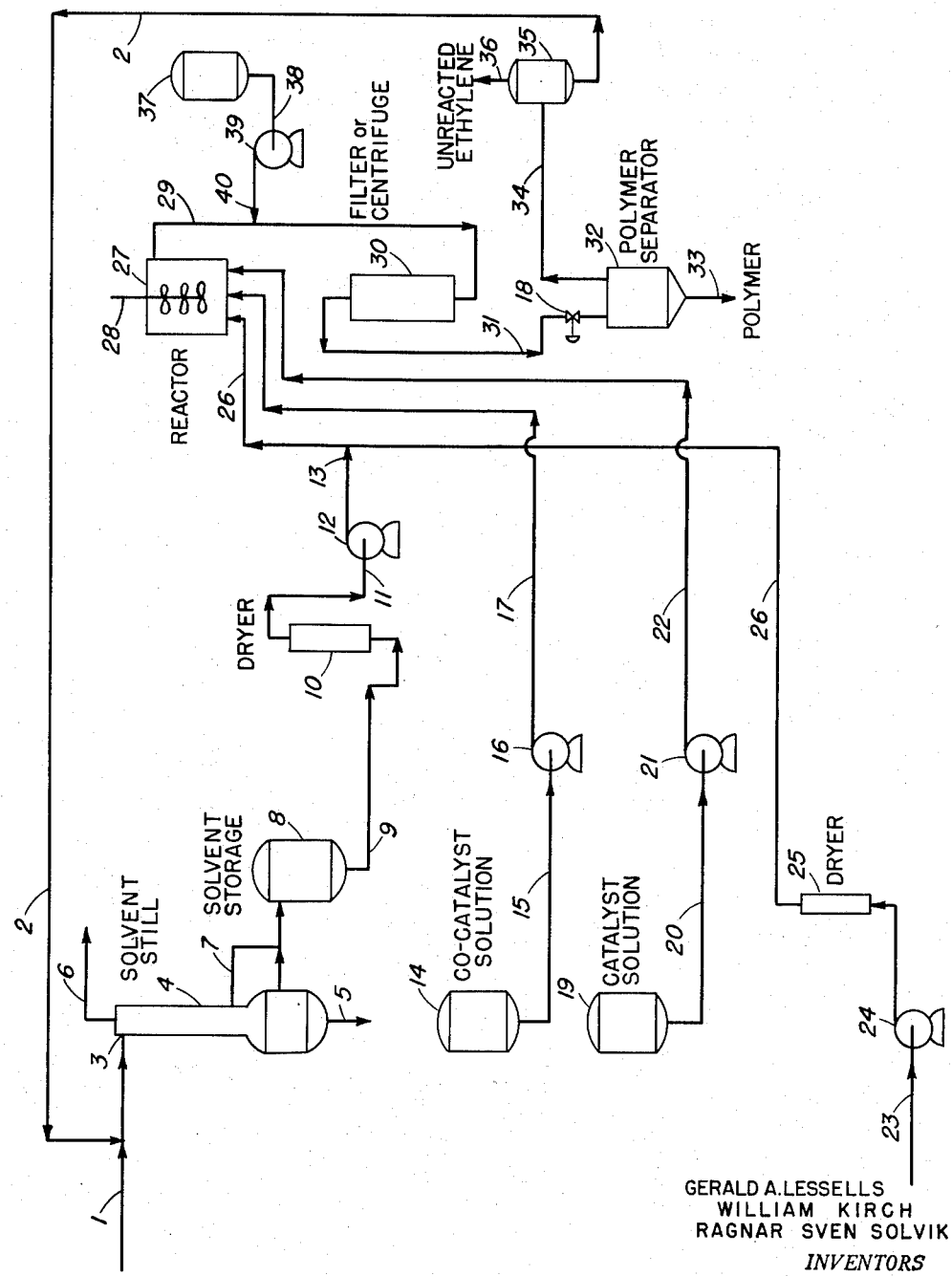

3,114,742
Patented Dec. 17, 1963

3,114,742
REMOVAL OF CATALYST FROM POLYOLEFIN BY TREATING WITH WATER AND OXIDIZING AGENT
Ragnar S. Solvik, Wyoming, William Kirch, Cincinnati, and Gerald A. Lessells, Sharonville, Ohio, assignors to National Distillers and Chemical Corporation, New York, N.Y., a corporation of Virginia
Filed Nov. 5, 1959, Ser. No. 851,155
11 Claims. (Cl. 260—93.7)

This invention is generally concerned with a novel process for manufacture of polymers, copolymers, and interpolymers, and, in particular, is concerned with a new process for polyethylene and copolymers of ethylene with other olefinic monomers.

A considerable interest has developed in a number of processes for the manufacture of polymers, including interpolymers and copolymers of ethylene, and especially at relatively low pressures as distinguished from the so-called commercial high pressure processes.

There has now been discovered a new process for production of these polymers, which process is the subject of this invention. By practice of this new process a number of advantages is obtained. These advantages include, but without limitations, relatively higher concentrations of polymer product in the final product solution, affording operations with decreased volumes of liquid and relative ease of isolation of the final polymer products, low ash content in the polymer by the use of improved techniques for catalyst residue removal, and also critically controlled catalyst and co-catalyst ratios, temperature, pressure, and other conditions of the polymerization reaction. It is another significant feature of the process that it can be operated in a continuous manner to produce solid polymers. Other advantages include both lower investment cost for building the plant, lower operating costs, and high catalyst efficiencies in the production of polymer and improved methods for recovery and purification of the polymer.

The process generally is contemplated for improved production of homopolymers of ethylene and propylene; however, copolymers of ethylene with alpha-olefins and various monoolefins and polyolefins can also be made, using from 1 to 99% by weight of ethylene with 99% to 1% by weight of the alpha-olefin. The alpha-olefins which can be employed include those having from 2 to 8 carbon atoms such as propylene, 1-butene, 1-pentene, 1-hexene, 1-heptene, 1-octene, and 4-methylpentene-1. Other useful hydrocarbons for making copolymers with ethylene and propylene include divinylbenzene, allene, dimethallyl, and isopentene. Comonomers which can broadly be used include mono-substituted ethylenes such as 1-pentene, vinylcyclohexene, $C_8$-$C_{14}$ mixed alpha-olefins, styrene, allylnaphthalene, and the like, 1,1-disubstituted ethylenes such as 2-methylbutene-1, mixed α- and β-pinenes, camphene and the like, 1,2-disubstituted ethylenes such as indene, acenaphthylene, cyclopentene, norbornylene, cyclohexene, trans-stilbene, 2-pentene and the like, conjugated dienes and trienes such as pentadiene-1,3, 1,2-dihydrobenzene, and allo-ocimene, unconjugated dienes such as mixed octadienes, hexadiene-1,5, 2,5-dimethylhexadiene-1,5, 1,4-dihydrobenzene, bicycloheptadiene, dicyclopentadiene, and 4-vinylcyclohexene-1, acetylenes such as isopropenyl acetylene and phenyl acetylene, chloroolefins such as β-methallyl chloride and chloromethyl norbornylene, and m-chlorostyrene, esters such as vinyl butyrate, vinyl acetate, and methyl acrylate, and nitrogen compounds such as vinyl carbazole, 4-vinyl pyridine and acrylonitrile. The monomers used in the process must be substantially pure. For example, ethylene of at least 99% purity is preferred although lower purity can be used. There should be less than 5 p.p.m. each of oxygen, water, and carbon dioxide in the feed to the reactor.

While the catalysts which are generally useful for this novel polymerization process are not critical, they should be of the class which causes polymerizable monomers both singly and in combination to undergo polymerization while in solution and under relatively mild reaction conditions, for instance, at temperatures below about 350° C. and pressures below about 6000 p.s.i.g. These polymerization catalysts are well known and are ordinarily combination catalysts consisting of more than one compound. For example, in the literature it has been shown that at lease two different materials with certain chemical characteristics are required to form such an active polymerization catalyst. These are: (1) the co-catalyst, or the reducing agent, and (2) the catalyst, or a metallic compound of a multivalent state. The co-catalyst or reducing agent may broadly be metal alkyls or aryls, metal hydrides, Grignard reagents, and alkali metals or alkaline earth metals. These co-catalysts preferably comprise an organometallic compound such as the alkyl or aryl compounds of a metal of the group: sodium, lithium, potassium, rubidium, cesium, beryllium, magnesium, calcium, strontium, barium, aluminum, gallium, indium, tantalum, zinc, cadmium, mercury, and mixtures thereof. Some of the more successfully used co-catalysts are triethylaluminum, tetrabutyltin, alkylsodium, sodium, sodium hydride, etc. The catalyst or metallic compound may be for instance, titanium or zirconium halides such as the tetrachlorides or the tetrabromides, or the subhalides thereof, vanadium tetrachloride, hafnium tetrachloride, thorium tetrahalides, hexavalent chromium compounds, and the like. The catalyst itself preferably comprises halides or oxyhalides of a metal of the group: titanium, zirconium, hafnium, vanadium, niobium, tantalum, molybdenum, tungsten, thorium, uranium, and mixtures thereof. Examples of known satisfactory coordination catalyst systems include titanium tetrachloride-aluminum triethyl, titanium tetrachloride-ethyl magnesium bromide, and titanium tetrachloride-lithium aluminum tetrabutyl.

In addition, it is sometimes desirable to modify, accelerate, or otherwise alter the course or scope of the polymerization by the addition of some third chemical agent. Examples of these are hydrogen, tetrachloroethylene, water, oxygen, ethers, aldehydes, ketones, and the like.

The most active catalyst complexes are formed from liquid or organosoluble metallic catalysts and co-catalysts, since more centers are provided for the formation of the active catalyst. In contrast, the active catalyst formed by the reduction (co-catalytic) of the catalyst is a finely dispersed solid. It is believed that coordination complexes are formed in the polymerization mixture or in the catalyst-co-catalyst mixture. While the chemical nature of these complexes is not known, it is believed that they are the active catalysts or catalysts components which initiate the polymerization of the monomers.

With respect to the particular catalyst system, however, this process is not restricted to any particular combinations or class of metal compound or of reducing agent. One advantage of the process is that it has flexibility and can be operated with a wide variety of catalysts. For example, a typical catalyst system may be a catalyst consisting of a transition metal halide either alone or in admixtures such as titanium tetrachloride and the like, and a co-catalyst consiting of an organometallic reducing agent, such as, for example, triethylaluminum, triisobutylaluminum, alkylaluminum sesquihalides and the like.

The catalysts and co-catalyst can be handled in a variety of ways for introduction into the polymerization zone. For example, it is possible to premix the metal halide catalyst and co-catalyst reducing agent directly and in the absence of any other materials and inject the mixture directly into the reactor. Another method satisfactory for operation is by injecting the catalyst and co-catalyst directly but separately as concentrates into the reaction zone. Since a solvent-diluent is used, it is also possible to mix the catalyst and co-catalyst separately with portions of the solvent-diluent and inject these mixtures separately into the reactor. Another method for operation, is to premix both the catalyst and co-catalyst and the diluent together outside the reaction zone and inject their total mixture into the reaction zone. If a method for catalyst and/or co-catalyst introduction is used in which the solvent-diluent material is used, it is possible to use varying amounts of this solvent-diluent in this application up to the total amount to be used in the reaction zone.

With respect to catalyst and co-catalyst concentrations and their relative ratios to each other, based on monomer feed, it has been found that from about 0.001 to 1% by weight of the metal halide catalyst and from about 0.003 to 3% by weight of co-catalyst reducing agent can be used with preferred ranges being from 0.005 to 0.3% of metal halide and from 0.015 to 0.9% of reducing agent. The ratio of co-catalyst to catalyst is also important and should be between 0.5 to 25.0 and preferably between 1.0 and 15.0. A number of variables exists and their effect on each other and on the product quality have been found to be important in operation of this process in a continuous manner. It has been found, for instance, that catalyst consumption increases at higher temperatures and particularly above about 270° C.

In order to maintain appropriate reactor environment, it is necessary to employ in the reactor zone a solvent-diluent. This is preferably a hydrocarbon liquid and may be, for example, aromatic hydrocarbons, such as benzene, toluene, xylenes, ethylbenzene; alicyclic hydrocarbons, such as cyclohexane, methylcyclopentane, cyclopentane; and saturated aliphatic hydrocarbons such as a petroleum fraction, pentanes, hexanes, heptanes and the like. Liquids other than hydrocarbons can be employed. However, care must be exercised to avoid any material which would interfere or take any part in the polymerization reaction. The group of hydrocarbons having from 5 to 9 carbon atoms are generally found to be most useful. It is necessary that the solvent-diluent be selected such that it is a fluid at all times under conditions existing within the polymerization zone.

With respect to purity, the solvent-diluent used must also meet certain specifications. Although these specifications and impurities may vary somewhat, in general, it is considered most advantageous to use liquids having less than one p.p.m. of water, less than 5 p.p.m. of carbon dioxide, and only traces of lower-boiling organic materials such as olefins, alcohols, ethers, and the like including compounds which might deactivate the catalyst.

A general process description is given below, but it is not intended to limit the operation specifically thereto. The diluent-solvent selected, for instance, cyclohexane is subjected to fractional distillation and thereby separated from any trace quantities of water present, as well as any low-boiling impurities. If desired, it is then passed to a drying unit and thereafter pumped up to an operating pressure of about 2000–6000 p.s.i.g. The 99% pure ethylene feed is also compressed to operating pressure and preferably treated to remove residual carbon dioxide, water vapor and oxygen by known purification techniques. The thus-purified ethylene is then dissolved in the diluent-solvent and passed to the reactor maintained under the operating pressure and at the operating temperature of about 180° to 280° C. In case the olefin feed is substantialy an $\alpha$-olefin, then the temperatures necessary may be somewhat lower.

Dilute solutions of the catalyst and co-catalyst such as titanium tetrachloride and triethylaluminum are also pumped up to the operating pressure and passed to the reactor, or as stated above, they can be premixed in either a suitable vessel or a stirred autoclave prior to entering the reactor. The reaction mixture is contacted in the reactor for from five to twenty minutes. During the period of contacting time the reacting mixture is in the reactor, it is substantially fluid except for the very finely divided particles of active catalyst present. After reaction is complete, there is preferably injected into the effluent stream from the reaction, said stream containing about 10% polymer, a stream of a deactivator-agglomerator, which converts the finely-divided, non-filterable catalyst particles into large inactivated catalyst particles which are of sufficient size to permit easy filtration and removal. Such deactivator-agglomerator material is a mixture of water and of an oxidizng agent.

After the solid deactivated catalyst particles are filtered or centrifuged from the reactor effluent, the pressure of the polymer reaction solution is let down to essentially atmospheric pressure and the mixture passed to a polymer separator. The excess solvent is flashed from the polymer and is preferably passed to the distillation zone for purification before being recycled to the reaction zone for reuse. The polymer is recovered from the separator and subjected to appropriate volatilization operation and, if desired, to one or more wax separation steps prior to final finishing.

Depending on the polymerization conditions, including temperature, pressure, and nature of the active catalysts used, these polymers may be liquids, greases, waxes, and solid polymers. In general, however, it is desirable and advantageous to operate the process under conditions as described above and employing catalysts such that so-called high density solid polymers are obtained. The ethylene polymers have density values above 0.94 and more especially in the range of 0.95 to 0.965. The co-polymers have density values from 0.90 to 0.95.

It has been found possible to prepare by this new process both the isotactic polymers and the linear type polymers, including both linear polyethylene and isotactic polypropylene.

The polymer products obtained generally have a number-average molecular weight of from 10,000 to 100,000 and a weight-average molecular weight of from 20,000 to 1,000,000. For example, a typical polymer prepared by this process has a number-average molecular weight of about 43,000 and a weight-average molecular weight of about 140,000. The wax content of the total polymer mixture may vary from 1 to 25%.

Many advantages are achieved by the use of the herein described process. Among these are lower capital investment costs for a large scale commercial plant, with appropriately lower plant operating costs, and ease and uniformity of product so produced, and unusual and surprisingly higher catalyst efficiencies.

The process is further distinguished by the conditions of operation in that a combination of comparatively high temperature and pressure as set forth above is employed as distinguished from other so-called low-temperature and low-pressure olefin polymerization processes. This unique combination of conditions results, among other things, in efficient methods for deactivation and/or removal of catalyst and more complete separation of the catalyst residues from the polymer itself.

Another outstanding advantage of the herein described process is that it is particularly well-adapted to continuous, large-scale production of polymers and copolymers of ethylene and polymers related thereto.

While there are disclosed below but a limited number of embodiments of the invention herein presented, it is possible to produce still other embodiments without departing from the inventive concept herein disclosed, and it is desired therefore that only such limitations be imposed on the appended claims as are stated therein.

EXAMPLE 1

This example of a typical preparation of a linear, high-density ethylene homopolymer will be more completely described and understood by reference to the accompanying flow plan which is a schematic diagram of a process for carrying out the herein described process.

The cyclohexane diluent solvent is purified by distillation. This cyclohexane is passed via line 1 and inlet 3 into solvent still 4 wherein it is subjected to distillation. The high boiling impurities, are removed from the distillation zone via line 5 and the lower boiling materials including water as an azeotrope are removed via line 6. The purified cyclohexane is recovered as a bottom or lower side stream 7 and passed into solvent storage tank 8, whence it is withdrawn as needed and passed to the polymerization reaction zone.

The ethylene feed steram is passed meanwhile via line 23 through compressor 24 to produce pressures of 2000 to 3500 p.s.i.g. This ethylene feed stream may be of purity as low as 85% provided such impurities as are present are inert and do not interfere with the operation of the process, although it is preferred that the purity be at least 99% for the highest quality and uniformity of polymer product. After the pressure has been brought to the required level, the ethylene stream is passed through dryer 25 and thence through line 26 into stirred polymerization reactor 27. Dryer 25 can be a caustic scrubber, a series of molecular sieves, or other convenient equipment for final purification and drying of the ethylene. If used, the absorption bed is periodically regenerated by heating with passage of nitrogen as required. The purified solvent is meanwhile passed from storage tank 8 via line 9 into dryer 10 wherein it is further and finally desiccated by passage through a bed of silica-gel. The dried solvent stream is then passed by line 11 through compressor 12 and then having been brought up to the required pressure, it is mixed with the ethylene stream of line 26 by line 13 and the solvent-ethylene mixture passed to reactor 27. The temperature within the reaction zone is controlled in the range of 200° to 270° C.

The titanium tetrachloride catalyst is preferably diluted in tank 19 with sufficient cyclohexane solvent to yield a solution of less than 0.5 wt. percent. Similarly, triethylaluminum co-catalyst is diluted in tank 14 with solvent to give a solution of less than 0.5 wt. percent. The diluted solutions are employed in amounts such that co-catalyst to catalyst ratio is between 1.0 and 13.0. The co-catalyst and catalyst solutions are passed respectively through lines 15 and 20 and pumps 16 and 21 to bring the pressure up to that used in reactor 27. They are then pumped separately via lines 17 and 22 respectively into the reactor 27. Alternatively, they may be premixed either in a tube or in a stirred autoclave.

Both the solvent storage tank as well as the catalyst solution tanks are kept under a nitrogen or other inert gas blanket, which is maintained anhydrous by suitable drying agents.

The polymerization reaction fluid, consisting of ethylene, solvent, catalyst and co-catalyst at 200° to 270° C. temperature and 2000 to 5000 p.s.i.g. pressure, is contacted in a stirred reactor 27 for ten to twenty minutes. Reactor 27 is stirred by agitator 28 which may be any conventional stirring device adapted to give adequate end-to-end mixing. The temperature is quite critical since below about 180° C. the viscosity of the polymer becomes too high to handle and above 270° C. there is excessive degradation of polymer to cause decreased conversion, increased wax formation and off-color products. Also at these higher temperatures, there is a drop in reaction rate and a sharp rise in catalyst consumption.

Under the preferred conditions when reaction is completed, the polymer is molten and the polymerization reactor contents are fluid.

The entire polymerization mixture is passed from reactor 27 via line 29. A mixture of an organic peroxide (for example t-butyl hydroperoxide) and/or hydrogen peroxide is made up in cyclohexane solvent in tank 37 and passed by line 38 through compressor 39 and line 40 into product line 29 maintained at substantially reaction pressure. This peroxide-containing mixture deactivates and agglomerates the catalyst by a process which is believed to involve oxidation and conversion of catalytic materials to titanium and aluminum oxides and/or hydroxides and causes the agglomeration of these materials into filterable particles. If desired, the treated reaction mixture is mixed with a mechanical filter aid and passed via line 29 to filter 30 where the solid particles, including substantially all ash-forming materials are removed. This filtration is preferably carried out at substantially the synthesis pressure and the filtered mixture passed by line 31 through let-down pressure valve 18, whereby the pressure is reduced to essentially atmospheric pressure.

Other methods can also be used to deactivate and remove the catalyst. For example, the entire mixture can be subjected to centrifuging, and an active catalyst recovered and recycled to the reaction zone.

Under any circumstance, the depressurized mixture is passed into polymer separator 32 wherein the cyclohexane solvent and unreacted ethylene are flashed from the polymer and thence pass via line 34 into condenser 35. Unreacted ethylene is recovered via line 36. Cyclohexane passes from condenser 35 by line 2 and line 1 back to the solvent still 4 and thence is recycled as required back to the polymerization reaction system.

The molten polymer product is withdrawn from polymer separator 32 via line 33 and dried and freed of solvent in any convenient manner. It may be further treated, purified and tested by any suitable method or process known for use on ethylene polymers.

Typical properties of ethylene polymer are as follows.

Melt index_____ 0.2–5.0 g./10 min. at 190° C.
Tensile yield strength_____ 4500–3200 p.s.i.
Melting temperature_____ 130–140° C.
Density_____ .95–.965 g./cc.

EXAMPLE 2

A series of polymerizations was carried out using the above described process. Table I shows some of the variations of conditions employed in each of runs No. 1 to 14 and Table II shows the results obtained in terms of properties of the ethylene homopolymers obtained in these runs.

In each case, titanium tetrachloride was employed as the catalyst, and triethylaluminum as the reducing agent or co-catalyst.

The temperature of operation varied from 200° to 270° C. with pressures from 2500 to 3500 p.s.i.g. and the runs varied in time from 4.5 to 13.0 hours. The catalyst and co-catalyst concentrations were varied in the range of about 0.2 to 0.5 wt. percent which is equivalent to about 0.02 weight percent based on the reactor contents. The co-catalyst to catalyst ratio was varied from about 1.0 to 1.5, conversion of ethylene to polymer varied from about 20 to 70 percent.

Table I
POLYMERIZATION REACTION CONDITIONS

| Run No. | Run Length (hr.) | Pressure (p.s.i.) | Temperature (°C.) | Ethylene Flow (lbs./hr.) | Contact Time (mins.) | Solvent Flow (lbs./hr.) | Catalyst Solution Flow (lbs./hr.) | Catalyst Conc. (wt. percent) | Co-catalyst Solution Flow (lbs./hr.) | Co-catalyst Conc. wt. percent | Co-catalyst to Cat. Wt. Ratio | Polymer Produced (lbs.) | Percent Conversion Polyethylene/Monomer Charged | Catalyst Consumption (lbs./1000 lb. Polymer) |
|---|---|---|---|---|---|---|---|---|---|---|---|---|---|---|
| 1 | 6.5 | 2,500 | 250 | 2.0 | 11 | 40 | 4.0 | 0.2 | 3.9 | 0.3 | 1.45 | 5.0 | 40 | 11 |
| 2 | 13.0 | 2,500 | 240 | 2.0 | 11 | 40 | 4.0 | 0.2 | 4.0 | 0.3 | 1.45 | 17.5 | | |
| 3 | 4.5 | 2,500 | 270 | 2.0 | 11 | 40 | 4.0 | 0.2 | 4.0 | 0.3 | 1.5 | 1.7 | 20 | 14 |
| 4 | 6.0 | 2,500 | 270 | 2.0 | 11 | 40 | 4.1 | 0.2 | 4.1 | 0.3 | 1.5 | 2.6 | 20 | 19 |
| 5 | 8.0 | 2,500 | 250 | 2.0 | 11 | 40 | 4.3 | 0.2 | 4.1 | 0.3 | 1.4 | 6.5 | 40 | 10 |
| 6 | 8.0 | 2,500 | 240 | 2.0 | 11 | 40 | 4.0 | 0.2 | 4.0 | 0.2 | 1.1 | 10.0 | 60 | 6.4 |
| 7 | 7.0 | 2,500 | 230 | 2.0 | 11 | 40 | 4.5 | 0.2 | 4.3 | 0.2 | 1.05 | 10.0 | 70 | 6.3 |
| 8 | 7.0 | 2,500 | 240 | 2.0 | 11 | 40 | 4.1 | 0.2 | 4.1 | 0.2 | 1.1 | 8.0 | 65 | 6.2 |
| 9 | 5.5 | 2,500 | 240 | 2.3 | 11 | 40 | 4.1 | 0.25 | 3.9 | 0.3 | 1.15 | 13.0 | | |
| 10 | 4.5 | 2,500 | 240 | 2.5 | 11 | 40 | 3.6 | 0.25 | 4.0 | 0.3 | 1.3 | 4.5 | 40 | 9.4 |
| 11 | 4.5 | 2,500 | 240 | 2.5 | 11 | 40 | 2.8 | 0.25 | 4.4 | 0.3 | 1.5 | 6.0 | 55 | 7.0 |
| 12 | 10.5 | 3,500 | 240 | 2.0 | 12 | 40 | 2.1 | 0.4 | 2.1 | 0.45 | 1.1 | 15.0 | 70 | 6.0 |
| 13 | 8.5 | 3,500 | 250 | 2.0 | 12 | 40 | 2.1 | 0.4 | 2.1 | 0.45 | 1.1 | 9.5 | 55 | 7.6 |
| 14 | 4.5 | 3,500 | 240 | 2.0 | 12 | 40 | 1.8 | 0.4 | 2.2 | 0.45 | 1.4 | 6.0 | 65 | 5.7 |

The properties of polymers prepared in Runs 1–14 are tabulated in Table II. In obtaining these data, a representative polymer sample was collected, blended by grinding, and dried at 80° C. under vacuum to remove residual solvent.

The melt index of the polymers was determined by ASTM Procedure 1238–52T–Part B.

Tensile strengths were determined by ASTM Procedure 1248. The melting point was determined by a hot stage microscope such as the Nalge instrument. Ash content was determined by standard ashing procedures and was quite low for all these polymers. Color was determined by comparison with polyethylenes of a varying arbitrary color scale running from 0 to 10 with commercial grade polyethylene asigned a value of one.

Table II
POLYMER PROPERTIES

| Run No. | Melt Index | Density (g./cc.) | Tensile Yield (p.s.i.) | Melting Point (°C.) | Ash (p.p.m. by wt.) | Color Scale (0–10) |
|---|---|---|---|---|---|---|
| 1 | 1.55 | 0.960 | 3,950 | 139 | 200 | 2 |
| 2 | 1.15 | 0.959 | 3,760 | 145 | 110 | 2 |
| 3 | 5.70 | 0.959 | 3,830 | 138 | 240 | 2 |
| 4 | 3.45 | 0.956 | 3,700 | 140 | 90 | 3 |
| 5 | 1.15 | 0.956 | 3,590 | 140 | 120 | 2 |
| 6 | 2.25 | 0.960 | 3,870 | 138 | 80 | 1.5 |
| 7 | 2.15 | 0.960 | 3,880 | 138 | 90 | 1.5 |
| 8 | 1.70 | 0.959 | 3,700 | 140 | 70 | 1.5 |
| 9 | 1.80 | 0.958 | 3,970 | 137 | 100 | 1 |
| 10 | 1.55 | 0.957 | 3,840 | 142 | 110 | 2.5 |
| 11 | 1.60 | 0.958 | 3,820 | 140 | 130 | 3 |
| 12 | 1.95 | 0.959 | 3,830 | 136 | 36 | 2.5 |
| 13 | 2.45 | 0.958 | 3,800 | 138 | 70 | 1.5 |
| 14 | 1.55 | 0.958 | 3,730 | 140 | 170 | 1.5 |

EXAMPLE 3

Another series of polymerizations was carried out using the herein described process. In each case, homogeneous liquid phase reaction conditions were maintained in the reactor substantially throughout the polymerization period. The mixed catalyst was varied in composition as shown in the individual runs and, in each case, the co-catalyst used was aluminum triethyl. The reactor conditions and the results obtained are shown in detail in Table III.

Table III

| | Run 15 | Run 16 | Run 17 |
|---|---|---|---|
| Synthesis Conditions: | | | |
| Phase Conditions in Reactor | (1) | (1) | (1) |
| Solvent Cyclohexane Feed Rate (lbs./hr.) | 30 | 30 | 30 |
| Ethylene Feed Rate (lbs./hr.) | 2 | 2 | 3.0 |
| Catalyst Type (wt. percent comp.) | | | |
| VOCl$_3$ | 65 | 73.5 | 25 |
| TiCl$_4$ | 20 | 23.5 | 75 |
| SiCl$_4$ | 15 | 2 | |
| Co-catalyst Type | Al(Et)$_3$ | Al(Et)$_3$ | Al(Et)$_3$ |
| Catalyst Feed Rate (lbs./hr.) | 0.00243 | 0.00153 | 0.0025 |

Table III—Continued

| | Run 15 | Run 16 | Run 17 |
|---|---|---|---|
| Synthesis Conditions:—Continued | | | |
| Co-catalyst Feed Rate (lbs./hr.) | 0.0123 | 0.0036 | 0.0048 |
| Co-catalyst/Catalyst Wt. Ratio | 5.05 | 2.3 | 1.92 |
| Reaction Temperature (°C.) | 230 | 230 | 235 |
| Reaction Pressure (lbs./sq. in.) | 2,500 | 2,500 | 2,500 |
| Reactor Residence Time (minutes) | 15 | 15 | 15 |
| Percent Conversion of Monomer to Polymer | 70 | 64 | 64 |
| Percent Conc. of Polymer in Solvent in Reactor | 4.7 | 4.3 | 6.4 |
| Catalyst Usage (lbs. cat./1000 lbs. polymer) | 1.7 | 1.2 | 1.3 |
| Polymer Properties: | | | |
| Polymer Melt Index (gms./10 min.) | 0.73 | 0.57 | 0.55 |
| Polymer Density (gms./ml.) | 0.9532 | 0.9536 | 0.9572 |
| Tensile Yield Strength (lbs./sq. in.) | 3,620 | 3,620 | 3,830 |
| Ultimate Tensile (lbs./sq. in.) | 3,390 | 3,390 | |
| Elongation (percent) | <300 | 280 | |
| Melting Point (°C.) | 132 | 133 | 135 |
| Wax Extractables (percent) | 7 | 12 | 5 |
| Torsional Stiffness (lbs./sq. in.) | | | 143,000 |
| Environmental Stress Crack (hrs.) | 15 | 23.5 | 19 |

[1] Homogeneous liq. phase.

EXAMPLE 4

A series of comparative runs were carried out using titanium tetrachloride as the catalyst and triethylaluminum as the co-catalyst in each case. Ethylene was the olefinic feed. The reactor conditions and the plymer properties obtained are shown in Table IV by runs Nos. 18, 19, and 20.

Table IV

| | Run 18 | Run 19 | Run 20 |
|---|---|---|---|
| Synthesis Conditions: | | | |
| Phase Conditions in Reactor | (1) | (1) | (1) |
| Solvent Cyclohexane Feed Rate (lbs./hr.) | 20 | 20 | 3.0 |
| Ethylene Feed Rate (lbs./hr.) | 2.0 | 2 | 0.5 |
| Catalyst Type (wt. Percent comp.) | TiCl$_4$ | TiCl$_4$ | TiCl$_4$ |
| Co-catalyst Type | Al$_3$ | Al$_3$ | Al$_3$ |
| Catalyst Feed Rate (lbs./hr.) | 0.0032 | 0.0036 | 0.0051 |
| Co-catalyst Feed Rate (lbs./hr.) | 0.0032 | 0.0048 | 0.0037 |
| Co-catalyst/Catalyst Wt. Ratio | 1.0 | 1.25 | 0.73 |
| Reaction Temperature (°C.) | 250 | 240 | 70 |
| Reaction Pressure (lbs./sq. in.) | 2,600 | 2,600 | 15 |
| Reactor Residence Time (minutes) | 20 | 19 | 145 |
| Percent Conversion of Monomer to Polymer | 38 | 55 | 70 |
| Percent Conc. of Polymer in Solvent in Reactor | 3.9 | 5.5 | 11.7 |
| Catalyst Usage (lbs. cat./1000 lbs. polymer) | 4.1 | 3.3 | 14.5 |
| Polymer Properties: | | | |
| Polymer Melt Index (gms./10/min.) | 2.11 | 0.94 | 0.71 |
| Polymer Density (gms./ml.) | 0.959 | 0.962 | 0.9515 |
| Tensile Yield Strength (lbs./sq. in.) | 3,930 | 3,940 | 3,458 |
| Melting Point (°C.) | 133 | 133 | 130 |
| Wax Extractables (Percent) | 38 | 30 | 12 |
| Environmental Stress Crack (hrs.) | 5 | 8 | 16 |

[1] Homogeneous liq. phase.
[2] Heterogeneous slurry (solid phase).

EXAMPLE 5

The herein described process was also utilized to prepare polypropylene using propylene as the olefinic monomer reactant. The reaction conditions and the results obtained in terms of polymer properties are shown in Table V (run No. 21).

*Table V*

|  | Run 21 |
|---|---|
| Synthesis Conditions: |  |
| Phase Conditions in Reactor | Homogeneous Liquid Phase. |
| Solvent Cyclohexane Feed Rate (lbs./hr.) | 20 |
| Propylene Feed Rate (lbs./hr.) | Propylene—2.0. |
| Catalyst Type (wt. Percent comp.): |  |
| $TiCl_4$ | 63 |
| $VOCl_3$ | 32 |
| $SiCl_4$ | 5 |
| Co-catalyst Type | $Al(ethyl)_3$. |
| Catalyst Feed Rate (lbs./hr.) | 0.0137. |
| Co-catalyst Feed Rate (lbs./hr.) | 0.0181. |
| Co-catalyst/Catalyst Wt. Ratio | 1.3. |
| Reaction Temperature (° C.) | 150. |
| Reaction Pressure (lbs./sq. in.) | 3,500. |
| Reactor Residence Time (minutes) | 19. |
| Percent Conversion on Monomer to Polymer | 80. |
| Percent Conc. of Polymer in Solvent in Reactor | 8. |
| Catalyst Usage (lbs. cat./1000 lbs. polymer) | 8.3. |
| Polymer Properties: |  |
| Polymer Melt Index (gms./10 min.) | 87.4. |
| Polymer Density (gms./ml.) | 0.9245. |
| Melting Point (° C.) | 168. |

EXAMPLE 6

A number of runs were also carried out using mixtures of olefinic feeds to give copolymers. The data describing the runs and the results obtained thereby are shown in Table VI. Run No. 22 used ethylene-propylene mixture and run No. 23 used ethylene-1-butene mixture as olefinic feed.

*Table VI*

|  | Run 22 | Run 23 |
|---|---|---|
| Synthesis Conditions: |  |  |
| Phase Conditions in Reactor | Homogeneous liquid phase. | Homogeneous liquid phase. |
| Solvent Cyclohexane Feed Rate (lbs./hr.) | 35 | 30. |
| Ethylene Feed Rate (lbs./hr.) | 2.4 | 2.0. |
| Co-monomer Feed Rate (lbs./hr.) | 0.15 (propylene). | 0.75 (butene-1). |
| Catalyst Type (wt. percent comp.) | $TiCl_4$ | 73.5% $VOCl_3$. 24.5% $TiCl_4$. 2% $SiCl_4$. |
| Co-catalyst Type | $Al(ethyl)_3$ | $Al(ethyl)_3$. |
| Catalyst Feed Rate (lbs./hr.) | 0.0042 | 0.00188. |
| Co-catalyst Feed Rate (lbs./hr.) | 0.00835 | 0.00412. |
| Co-catalyst/Catalyst Wt. Ratio | 2.0 | 2.2. |
| Reaction Temperature (° C.) | 230 | 230. |
| Reaction Pressure (lbs./sq. in.) | 2,600 | 2,500. |
| Reactor Residence Time (minutes) | 13 | 15. |
| Percent Conversion of Monomer to Polymer | 52 (total monomer). | 38 (total monomer). |
| Percent Conc. of Polymer in Solvent in Reactor. | 3.8 | 3.5. |
| Catalyst Usage (lbs. cat./1000 lbs. polymer). | 3.2 | 1.8. |
| Polymer Properties: |  |  |
| Polymer Melt Index (gms./10 min.) | 1.57 | 0.72. |
| Polymer Density (gms./ml.) | 0.9470 | 0.9472. |
| Tensile Yield Strength (lbs./sq. in.). | 2,870 | 3,230. |
| Melting Point (° C.) | 138 |  |
| Wax Extractable (percent) | 15 | 3. |

What is claimed is:

1. A process for the continuous polymerization of olefinic monomers to polymers which comprises polymerizing at least one olefinic monomer having 2 to 8 carbon atoms per molecule in the presence of from about 0.001 to 1% by weight, based on monomer feed, of a metal halide catalyst derived from a multivalent transition metal and from about 0.003 to 3% by weight, based on monomer feed, of a co-catalyst reducing agent therefor, the ratio of co-catalyst to catalyst being controlled between 0.5 and 25.0, in the presence of an inert solvent-diluent at a pressure of about 2000–6000 p.s.i.g. and a temperature of about 180°–280° C., thereafter subjecting the reaction mixture to contact with water and an oxidizing agent whereby deactivation and agglomeration of the catalyst as a solid takes place, separating the solid particles from the polymer containing liquid, releasing the pressure to substantially atmospheric, and thereafter separating the polymers from unreacted olefinic monomer and solvent-diluent.

2. The process of claim 1 in which at least one olefinic monomer is ethylene.

3. The process of claim 1 in which at least one olefinic monomer is propylene.

4. A continuous process for the production of polymers which comprises polymerizing at least one olefinic monomer in the presence of a combination catalyst system comprising essentially a metal halide catalyst derived from a multivalent transition metal and a co-catalyst reducing agent therefor, the ratio of co-catalyst to catalyst being controlled between 0.5 and 25.0 in the presence of an inert hydrocarbon solvent-diluent having 5 to 9 carbon atoms, at a pressure of about 2000–6000 p.s.i.g. and a temperature of about 180°–280° C., in a stirred reactor, contacting the resulting reaction mixture with water and an oxidizing agent thereby deactivating and agglomerating the catalyst, separating the solid deactivated catalyst particles from the fluid reaction mixture, releasing the pressure to substantially atmospheric, and separating the polymer from unreacted olefinic monomer and solvent-diluent.

5. The process of claim 4 in which at least one olefinic monomer is ethylene.

6. The process of claim 4 in which at least one olefinic monomer is propylene.

7. The process of claim 4 in which the sole monoolefinic monomer is ethylene.

8. The process of claim 4 in which the sole monoolefinic monomer is propylene.

9. The process for continuous polymerization of a monomeric olefin which comprises passing a catalyst comprising a metal halide derived from a multivalent transition metal and a co-catalyst capable of reducing the metal in said catalyst to lower valence, the ratio of co-catalyst to catalyst being maintained between 1.0 and 13.0 concurrently into a stirred reaction zone, continously passing an inert hydrocarbon solvent-diluent into said reaction zone, simultaneously and continuously passing an olefinic polymerizable monomer into said reaction zone, maintaining the temperature in said reaction zone at between 180° and 280° C. and the pressure at 2000–6000 p.s.i.g. to produce thereby a polymer in a fluid reaction mixture in a 1 to 25% concentration therein, thereafter deactivating the reduced catalyst by the addition of water and an oxidizing agent to produce inactivated solid catalyst particles, separating said solid particles by gravimetric methods, and thereafter recovering the polymer.

10. The process of claim 9 in which the monomeric olefin is ethylene.

11. The process of claim 9 in which the monomeric olefin is propylene.

References Cited in the file of this patent

UNITED STATES PATENTS

| 2,833,755 | Coover | May 6, 1958 |
| 2,882,264 | Barnes et al. | Apr. 14, 1959 |
| 2,886,561 | Reynolds et al. | May 12, 1959 |
| 2,890,214 | Brightbill et al. | June 9, 1959 |
| 2,905,659 | Miller | Sept. 22, 1959 |
| 2,962,488 | Horne | Nov. 29, 1960 |
| 3,001,977 | Wisseroth | Sept. 26, 1961 |